United States Patent [19]

Robins et al.

[11] Patent Number: 4,704,331

[45] Date of Patent: Nov. 3, 1987

[54] METHOD FOR ADHERING SURFACES USING FAST CURING EPOXY RESIN COMPOSITIONS

[75] Inventors: Janis Robins, St. Paul; Charles D. Wright, Birchwood, both of Minn.

[73] Assignee: Minnesota Mining and Manufacturing Company, St. Paul, Minn.

[21] Appl. No.: 12,817

[22] Filed: Feb. 9, 1987

Related U.S. Application Data

[60] Division of Ser. No. 842,461, Mar. 21, 1986, Pat. No. 4,668,736, which is a continuation-in-part of Ser. No. 632,213, Jul. 18, 1984, abandoned.

[51] Int. Cl.$^4$ ............................................. B32B 27/38
[52] U.S. Cl. .................................... 428/414; 156/330; 428/413; 428/416
[58] Field of Search ................ 156/330; 428/413, 414, 428/416; 525/65

[56] References Cited

U.S. PATENT DOCUMENTS

| | | | |
|---|---|---|---|
| 3,018,262 | 1/1962 | Schroeder | 260/29.2 |
| 3,257,342 | 6/1966 | Kwong | 260/18 |
| 3,454,436 | 7/1969 | Bedell | 149/19 |
| 3,496,250 | 2/1970 | Czerwinski | 260/836 |
| 3,532,653 | 10/1970 | Smeal | 260/24 |
| 4,026,858 | 5/1977 | Andrews et al. | 260/30 |
| 4,101,459 | 7/1978 | Andrews | 260/18 |
| 4,112,231 | 9/1978 | Weibull et al. | 544/174 |
| 4,130,511 | 12/1978 | Andrews | 528/92 |
| 4,187,367 | 2/1980 | Waddill | 528/94 |
| 4,389,515 | 6/1983 | DeLaMare et al. | 525/420 |
| 4,397,998 | 8/1983 | DeLaMare et al. | 525/420 |

FOREIGN PATENT DOCUMENTS

| | | |
|---|---|---|
| 1645079 | 7/1972 | Fed. Rep. of Germany . |
| 1105772 | 3/1968 | United Kingdom . |
| 1484797 | 9/1977 | United Kingdom . |

OTHER PUBLICATIONS

Toughening of Plastics, Adhesive Fracture Behaviro of CTBN-Modified Epoxy Polymers, W. D. Bascom and D. L. Hunston of the Naval Research Laboratory.

*Primary Examiner*—Theodore E. Pertilla
*Attorney, Agent, or Firm*—D. M. Sell; J. A. Smith; C. Truesdale

[57] ABSTRACT

A method for adhering surfaces together using fast curing epoxy resin compositions is provided. The method includes the steps of mixing together (a) a curable glycidyl ether epoxide group-containing compound, (b) an amino-terminated aliphatic polyether curing agent, (c) a polymeric toughening agent having both a rubbery phase and a thermoplastic phase or being capable of forming, with the epoxide group-containing material, both a rubbery phase and a thermoset phase on curing, and (d) a metal salt catalyst capble of providing an exotherm of at least 20° C.; applying the resulting mixture to a portion of at least one surface; contacting the surface having the mixture applied thereto to a second surface in bonding relationship with the mixture disposed between the surfaces; and curing the mixture.

6 Claims, No Drawings

METHOD FOR ADHERING SURFACES USING FAST CURING EPOXY RESIN COMPOSITIONS

BACKGROUND OF THE INVENTION

1. Related Applications

This application is a division of application Ser. No. 842,461, filed Mar. 21, 1986, now U.S. Pat. No. 4,668,763, which is a continuation-in-part of application Ser. No. 632,213 filed July 18, 1984, now abandoned.

2. Field of the Invention

This invention relates to fast curing epoxy resin compositions. This invention also relates to two-part epoxy resin compositions which cure rapidly at room temperature and exhibit superior toughness.

3. Description of the Prior Art

Epoxy resins, i.e., organic compounds having one or more terminal or pendant oxirane groups

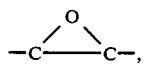

have been widely used for many years in compositions for making adhesives, coatings, and molded, cast and potted products because of the relative ease with which they can be converted to cured solid products that are strong and resistant to many chemical environments. These epoxy resins may be cured using such curing agents as polyamide, polyamine, urea, phenolic and substituted phenolic curing agents, Lewis acid curing agents and carboxylated curing agents. Although the polyamine and polyamide curing agents are effective for curing the epoxy resins at room temperature, the cure rate is undesirably slow for many specific curing agents and end uses. To overcome this deficiency, the addition of certain catalysts to epoxy compositions has been described. U.S. Pat. No. 4,389,515 and U.S. Pat. No. 4,397,998 disclose rapid curing of epoxy resins for use in injection molding using a curing combination of an amino compound containing at least three amino hydrogens as curing agent, a Group I or Group II metal nitrate, iodide, thiocyanate, alkoxide or perchlorate at catalyst and polyalkylene ether glycol as stabilizer/solvent. U.S. Pat. No. 4,026,858 discloses accelerated curing of epoxy resins by use of aromatic or cycloaliphatic polyamines as curing agent and magnesium, calcium, zinc, manganese, cobalt or nickel perchlorate as catalyst. U.S. Pat. No. 4,101,459 discloses accelerated curing of epoxy resins by use of aromatic, heterocyclic or cycloaliphatic polyamines as curing agent and salts of trifluoromethanesulfonic acid as a catalyst. U.S. Pat. No. 4,130,511 discloses accelerated curing of epoxy resins by use of aromatic polyamides as curing agent and magnesium nitrate or a nitrate of an at least divalent metal of Group IIB, IIIB, IVB, VIB, VIIB or VIII as a catalyst. U.S. Pat. No. 4,112,231 discloses condensation of epoxides with organic compounds having an active hydrogen atom in the presence of a neutral organic salt such as sodium fluoborate, magnesium perchlorate, calcium perchlorate, manganese perchlorate, nickel perchlorate and zinc perchlorate. U.S. Pat. No. 3,018,262 discloses curing epoxy resins with metal salts of inorganic acids to provide fabric finishes for imparting crease and shrink resistance. U.S. Pat. No. 3,454,436 discloses promoting the cure of epoxy resins by polyamine curing agents by including lithium perchlorate as a catalyst to provide solid rocket propellant.

The incorporation into epoxy resins of epoxy resin-insoluble modifiers to reduce brittleness to shock has been described. U.S. Pat. No. 3,496,250 discloses the blending of an acrylonitrile butadiene-styrene graft polymer into epoxy resins to impart flexibility, shear strength and impact characteristics to cured epoxy resin.

SUMMARY OF THE INVENTION

The present invention provides an epoxy resin composition comprising a curable glycidal ether epoxide group-containing material, an amino-terminated aliphatic polyether curing agent, a polymeric toughening agent, having both a rubbery phase and a thermoplastic phase or being capable of forming, with the epoxide group-containing material, both a rubbery phase and a thermoset phase on curing, and a catalyst capable of providing an exotherm of at least 20° C.

The epoxy resin composition of the present invention is useful for providing adhesives that rapidly cure to provide adhesive bonds having high peel strength and high lap shear strength at room temperature and after aging at 120° C. to 150° C. or higher.

Surprisingly, it has been discovered that by adding both a catalyst and a toughening agent to the epoxide group-containing compound and the amino-terminated aliphatic polyether curing agent, rapid cure as well as high peel strength and high lap shear strength of the adhesive at room temperature and after high temperature aging can be achieved, even though the addition of only the catalyst or only the toughening agent can reduce peel strength. The epoxy resin of the present invention is also useful in such applications as coatings, molded products, cast products, encapsulation and potting products, and sealants.

The epoxy resin composition of the present invention preferably is provided as a fluid two-part composition capable of being mixed and then rapidly cured to an epoxy resin. The composition preferably is mixed on site either manually or by the use of conventional metered mixing equipment and the like at the time of application.

DETAILED DESCRIPTION OF THE INVENTION

The epoxy resin composition of the present invention is fast curing, has high peel strength after aging at temperatures of 120° C. to 150° C., and comprises a curable epoxide group-containing compound, an amino-terminated aliphatic polyether curing agent, a polymeric toughening agent having both a rubbery phase and a thermoplastic phase or being capable of forming, with the epoxide group-containing material, both a rubber phase and a thermoset phase on curing, and a catalyst capable of providing an exotherm of at least 20° C. In a preferred embodiment, the epoxy resin composition can be provided as a fluid, two-part composition capable of rapidly curing to an epoxy resin, the two-part composition having the parts of the composition stored in separate containers, the parts being capable of being mixed when the composition is to be applied, comprising:

(a) in a first part, 75 to 100 parts by weight of a curable glycidyl ether epoxide group-containing compound, (b) in a second part, a chemically effective amount of at least one amino-terminated aliphatic polyether curing agent, (c) in at least one of said parts, about 8 to 40 parts by weight of a polymeric toughening agent having both a rubbery phase and a thermoplastic phase or being capable of forming, with the epoxide group-containing material, both a rubbery phase and a thermoset phase on curing, and (d) in at least one of said parts, about 1 to 10 parts by weight of a metal salt catalyst selected from calcium nitrate, lanthanum nitrate, and metal salts having calcium, strontium, or barium cations and perchlorate or trifluoromethane sulfonate anions.

Although certain metal salts have been disclosed for accelerating the cure of epoxy resins when the curing agent is an aromatic, heterocyclic, or cycloaliphatic polyamine, these catalysts are not entirely satisfactory when amino-terminated aliphatic polyethers are used as the curing agent in the absence of a toughening agent. Although cure rate may be accelerated by some of the suggested catalysts, mechanical properties such as peel strength and shear strength are adversely affected, particularly after high temperature aging. Similarly, addition of a toughening agent, such as an acylonitrile butadiene-styrene graft polymer, to an aliphatic amino-terminated polyether cured epoxy composition, in the absence of the metal salt catalyst of this invention, may adversely affect the peel strength of the cured resin composition.

Epoxide group-containing materials useful in the compositions of the invention are glycidyl ether derivatives having an oxirane ring polymerizable by ring opening. Such materials, broadly called glycidyl ether epoxides, include monomeric epoxy compounds and epoxides of the polymeric type.

These epoxide group-containing materials can vary from low molecular weight monomeric materials to high molecular weight polymers and can vary in the nature of their backbone and substituent groups. Illustrative permissible substituent groups include halogens, ethers, and siloxane groups. The molecular weight of the epoxy-containing materials can vary from 50 to about 100,000 or more. Mixtures of various epoxy-containing materials can also be used in the composition of this invention.

Such epoxide group-containing materials are well-known and include such epoxides as glycidyl ether type epoxy resins and the diglycidyl ethers of bisphenol A and of novolak resins, such as described in "Handbook of Epoxy Resins" by Lee and Neville, McGraw-Hill Book Co., New York (1967).

These epoxide group-containing materials which are useful in the practice of this invention include glycidyl ether monomers of the formula

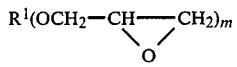

where $R^1$ is alkyl or aryl and m is an integer of 1 to 6. Examples are the glycidyl ethers of polyhydric phenols obtained by reaching a polyhydric phenol with an excess of chlorohydrin such as epichlorohydrin (e.g., the diglycidyl ether of bisphenol A, i.e., 2,2-bis(2,3-epoxy propoxyphenol)propane).

There are a host of commercially available epoxide group-containing material which can be used in this invention. In particular, epoxides which are readily available include glycidol, diglycidyl ethers of bisphenol A (e.g., those available under the trade designations "Epon 828" available from Shell Chemical Co., and "DER-331", "DER-332", and DER "334" available from Dow Chemical Co.), silicone resins containing diglycidyl epoxy functionality, flame retardant epoxy resins (e.g., "DER-580", a brominated bisphenol type epoxy resin available from Dow Chemical Co.), 1,4-butanediol diglycidyl ethers (e.g., "Araldite RD-2" available from Ciba-Geigy), polyglycidyl ethers of phenol formaldehyde novolak (e.g., "DEN-431" and "DEN-438" available from Dow Chemical Co.), and resorcinol diglycidyl ethers (e.g., "Kopoxite" available from Koppers Company, Inc.)

The curing agents useful in compositions of the invention are amino-terminated aliphatic polyethers. As used herein, the term amino-terminated aliphatic polyether curing agents mean organic materials capable of cross-linking epoxide group-containing materials, having two or more aliphatic backbone units, two or more ether backbone units, and two or more terminal amino groups bearing one or more active hydrogen atoms. These materials may have catenary atoms and substituents which do not interfere with the ability of the material to crosslink.

A preferred class of amino-terminated aliphatic polyethers are polyether diamine compounds of the general formula

   I wherein
$R^2$ is a linear or branched chain alkylene group having 2 to 4 carbon atoms,
$R^3$ hydrocarbolene group having 2 to 8 carbon atoms selected from straight and branched chain alkylene groups having 2 to 4 carbon atoms, cycloalkylene group having 4 to 8 carbon atoms, and arene groups having 6 to 8 carbon atoms, and
n is a number having a value of 1 to 10 such that the number average molecular weight of the compound is from 175 to 750, preferably 175 to 500.

Examples of useful polyether diamines include ethylene ether diamines, such as

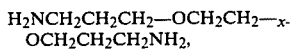

where x is from about 1 to 10, and propylene ether diamines, such as

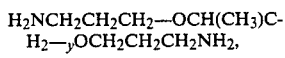

where y is from about 1 to 10.

A further preferred class of amino-terminated aliphatic polyethers suitable for use in the present invention are derived from, i.e., prepared from of capable of being prepared or obtained from, polycarboxylic acids and the polyether diamines described above. The resulting amino-terminated aliphatic polyether polyamides, sometimes referred to as "polyetherpolyamides" herein, may be derived from a wide variety of polycarboxylic acids, but particularly preferred are polymeric fatty acids such as dimer fatty acids or mixed dimer and trimer acids. Exemplary of such polymeric fatty acids is "Empol 1022", available from Emery Chemical Co., which is prepared by polymerizing $C_{18}$ unsaturated fatty acids and has the following characteristics:

| | |
|---|---|
| Acid value (mg. KOH/gm.) | 180 |
| Saponification value (mg. KOH/gm.) | 185 |
| Unsaponifiables | <2.0% |
| Neutralization equivalent | 300 |
| Dimer content, $C_{36}$ | 72% |
| Trimer content $C_{54}$ | 22% |
| Monomer content | 3% |
| Specific gravity at 15.5° C./15.5° C. | 0.95 |
| Viscosity at 25° C. | About 10,000 cps |

The cured products obtained by using polyetherpolyamides derived from polymeric fatty acids to cure epoxide group-containing compounds have a very desirable combination of both flexibility and high water resistance. Suitable polyetherpolyamides can also be prepared from shorter-chain polycarboxylic acids, but the cured products of mixtures thereof in epoxy resin compositions have somewhat less flexibility than is obtained when the polyetherpolyamide is derived from polymeric fatty acids. Suitable polyetherpolyamides are further disclosed in U.S. Pat. No. 3,257,342 which is incorporated herein by reference.

In preparing the polyetherpolyamide, the amino-terminated aliphatic polyether should be employed in an amount providing at least 1.1 amino groups per carboxyl group of the polycarboxylic acid, and it is preferred to keep the ratio at 1.5:1 or above. The higher the ratio is, up to slightly over 2:1, the easier the reaction is to control. Small amounts of free polyether diamine may be added after the reaction with the polycarboxylic acid is completed in order to adjust the amine equivalent weight for specific requirements.

It will be appreciated by those skilled in the art that the skeletal chain of the polyetherpolyamide may contain small proportions of other groups, e.g., the residue of ethylene diamine, without interfering with the ability of the epoxy resin composition to cure quickly at room temperature without undue exotherm to a strong, flexible state.

A chemically effective amount of the aliphatic amino-terminated aliphatic polyether curing agent should be used in the epoxy resin composition. Preferably, for 100 parts by weight of epoxide group-containing compound, from about 25 to 200 parts by weight of the amino-terminated aliphatic polyether curing agent are employed.

Polymeric toughening agents which are useful in the present invention are polymeric compounds having both a rubbery phase and a thermoplastic phase or being capable of forming, with the epoxide group-containing material both a rubbery phase and a thermoset phase on curing and which inhibit cracking of the cured epoxy composition.

A preferred class of polymeric toughening agents which are capable of forming, with the epoxide group-containing material, both a rubbery phase and a thermoset phase on curing are carboxyl-terminated butadiene acrylonitrile compounds having the general formula

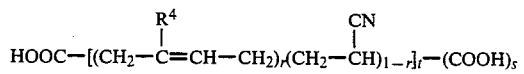

where $R^4$ is hydrogen or a methyl group, r is about 0.90 to 0.6, s is about 1 to 3, and t is about 16 to 50.

Other preferred polymeric toughening agents are graft polymers which have both a rubbery phase and a thermoplastic phase, such as those disclosed in U.S. Pat. No. 3,496,250 which is incorporated herein by reference. These graft polymers have a rubbery backbone with a thermoplastic polymer grafted thereto. Examples of such graft polymers include methacrylate/butadiene-styrene, acrylate-methacrylate/butadiene-styrene and acrylonitrile/butadiene-styrene polymers. The rubbery backbone preferably can be prepared so as to constitute from about 95 percent to about 40 percent by weight of the total graft polymer, and the thermoplastic monomer or group of monomers which are polymerized in the presence of the rubbery backbone constitute from about 5 percent to about 60 percent by weight of the graft polymer.

Further preferred polymeric toughening agents which have both a rubbery phase and a thermoplastic phase are acrylic core-shell polymers wherein the core is an acrylic polymer having a glass transition temperature below about 0° C., such as polybutyl acrylate or polyisooctyl acrylate, and the shell is an acrylic polymer having a glass transition temperature above about 25° C., such as polymethylmethacrylate. Commercially available acrylic core-shell graft polymers include "Acryloid" KM 323 and "Acryloid" KM 330 (Rohm and Haas Co.)

For two-part compositions, the toughening agent can be provided either in the epoxide group-containing portion of the two-part composition or in the amino-terminated aliphatic polyether portion of the two-part composition. To achieve the desired high peel strength and high lap shear strength after high temperature aging, it is preferred to employ from about 5 to 50 parts by weight, more preferably 10 to 30 parts by weight of toughening agent for 100 parts by weight of epoxide group-containing compound.

Catalysts which are useful in the present invention are those which are capable of providing an exotherm of at least 20° C., preferably at least 30° C., and more preferably at least 100° C., when the catalyst is combined with the epoxide group-containing compound and the amino-terminated aliphatic polyether. Metal salts can be evaluated for catalytic activity as follows:

In a paper cup are placed 31 g of a selected epoxide group-containing compound, 19 g of a selected amino-terminated aliphatic polyether curing agent, and 1 g of a solution fo 50% metal salt in the ethyl ether of ethylene glycol. These ingredients are mixed at 20° C. and allowed to react for five minutes. The temperature (°C.) is measured after this five minute period. The exotherm (°C.) is determined by subtracting 20° C. from the temperature of the reaction mixture measured at five minutes.

Runs were made following the above-described procedure using, as the epoxide-group containing compound, "Epon 828", available from Shell Chemical Co. (a condensation product of bisphenol A and epichlorohydrin, having an epoxide equivalent weight of 180-195), and, as the curing agent, "ZZL-0822", available from Union Carbide Co. (an ethylene ether diamine). The results are shown in Table 1.

TABLE 1

| Run | Metal salt | Exotherm °C. |
|---|---|---|
| 1 | Ca(ClO$_4$)$_2$ | 155 |
| 2 | Sr(ClO$_4$)$_2$ | 150 |
| 3 | Sr(ClO$_4$)$_2$.6H$_2$O | 120 |

TABLE 1-continued

| Run | Metal salt | Exotherm °C. |
|---|---|---|
| 4 | Ba(ClO$_4$)$_2$ | 110 |
| 5 | Ca(NO$_3$)$_2$ | 100 |
| 6 | Ca(ClO$_4$)$_2$.4H$_2$O | 35 |
| 7 | Ca(CF$_3$SO$_3$)$_2$ | 35 |
| 8 | Ba(ClO$_4$)$_2$.6H$_2$O | 30 |
| 9 | Sr(CF$_3$SO$_3$)$_2$ | 22 |
| 10 | La(NO$_3$)$_2$ | 21 |
| 11 | Ba(CF$_3$SO$_3$)$_2$ | 20 |
| 12 | Ca(NO$_3$)$_2$.6H$_2$O | 19 |
| 13 | Sr(CF$_3$SO$_3$)$_2$.YH$_2$O* | 17 |
| 14 | Ca(CF$_3$SO$_3$)$_2$.YH$_2$O* | 16 |
| 15 | LiClO$_4$ | 12 |
| 16 | LiCF$_3$SO$_3$ | 12 |
| 17 | LiCF$_3$SO$_3$.YH$_2$O* | 12 |
| 18 | LiNO$_3$ | 11 |
| 19 | LiClO$_4$.4H$_2$O | 10 |
| 20 | Ba(CF$_3$SO$_3$)$_2$.YH$_2$O* | 8 |
| 21 | La(CF$_3$SO$_3$)$_3$ | 8 |
| 22 | LiNO$_3$.4H$_2$O | 8 |
| 23 | Mg(CF$_3$SO$_3$)$_2$ | 7 |
| 24 | La(NO$_3$)$_3$.6H$_2$O | 7 |
| 25 | Mg(ClO$_4$)$_2$ | 6 |
| 26 | Mg(ClO$_4$)$_2$.6H$_2$O | 6 |
| 27 | Mg(CF$_3$SO$_3$)$_2$.YH$_2$O* | 6 |
| 28 | La(CF$_3$SO$_3$)$_3$.YH$_2$O* | 6 |
| 29 | Mg(NO$_3$)$_2$ | 6 |
| 30 | Mg(NO$_3$)$_2$.YH$_2$O* | 6 |

*hydrated metal salt, exact waters of hydration not determined.

The data in Table 1 demonstrate the exotherms attained with the various metal salts tested in the particular epoxide group-containing compound/amino-terminated aliphatic polyether system evaluated. The metal salts which produce exotherms greater than 20° C. are those which provide the desired acceleration of cure rate in the practice of the present invention, the cure rate being directly related to the exotherm. Anhydrous metal salt catalysts are preferred because the presence of water, as water of hydration in the metal salt or as water contained separately in the composition, often reduces the cure rate as measured in terms of the exotherm. Where water is present in the composition, the cure rate may be increased by increasing the amount of catalyst used.

Preferred catalysts are metal salts selected from calcium nitrate, lanthanum nitrate and metal salts having calcium, strontium, or barium cations and perchlorate or trifluoromethane sulfonate anions. Especially preferred catalysts are calcium perchlorate and strontium perchlorate.

The amount of catalyst required depends on the acceleration of cure rate desired. Where large areas are to be coated with the epoxy resin composition of the invention, a slower curing time is often desirable so that the entire area can be coated before the composition cures. Generally, about 1 to 10 parts by weight of catalyst for 100 parts by weight of epoxide group-containing compound are employed. The greater the amount of catalyst used, the greater the increase in acceleration of the cure rate. However, as the amount of catalyst is increased, the exotherm during curing increases. If too much catalyst is used, the epoxy resin composition becomes sufficiently hot during curing that degradation of the resin composition can occur.

To determine the effective amount of catalyst for the desired acceleration of cure rate the following method may be used. Calcium perchlorate catalyst is shown in the method, but other catalysts can be substituted as desired, as can various epoxide group-containing compounds and amino-terminated aliphatic polyether curing agents.

To a mixture of an epoxide group-containing compound, specifically "DER 322" from Dow Chemical Co. and calcium perchlorate catalyst in a metal cup was added varying amounts of various amino-terminated aliphatic polyether curing agents, the amount of each ingredient being indicated in Table 3. The various curing agents selected include "ZZL-0822" (Union Carbide Co.), "Polyetherpolyamide I" (see Example 1 for preparation) and "Polyetherpolyamide III" (see Example 18 for preparation). The cure rates of the epoxy resin compositions formed were evaluated in terms of worklife, the period of time over which the sample became too viscous to spread. The results are shown in Table 2.

TABLE 2

| Curing agent | Curing agent amount (g) | Epoxide amount (g) | Catalyst amount (g) | Worklife (min) |
|---|---|---|---|---|
| ZZL-0822 | 4.6 | 15.4 | 0 | 360 |
| ZZL-0822 | 4.6 | 15.4 | 0.69 | 1 |
| ZZL-0822 | 4.6 | 15.4 | 1.39 | 0.5 |
| Polyetherpolyamide I | 11.5 | 8.5 | 0 | 360 |
| Polyetherpolyamide I | 11.5 | 8.5 | 0.38 | 21 |
| Polyetherpolyamide I | 11.5 | 8.5 | 0.76 | 6 |
| Polyetherpolyamide III | 8.2 | 11.8 | 0 | 210 |
| Polyetherpolyamide III | 8.2 | 11.8 | 0.53 | 18 |
| Polyetherpolyamide III | 8.2 | 11.8 | 1.06 | 5 |

The epoxy resin compositions of the invention may contain other hardeners, monoepoxides or other reactive or nonreactive materials in desired amounts. Nonreactive solid materials may be used in very large amounts if the reactive materials are selected to provide a compensatory lowering of viscosity. Carbon black, silica, clays, talc, calcium carbonate, glass fiber, powdered inert resins, and powdered metals or metal oxides may be employed to effect a cost reduction, to ease thermal strains, to lend particular electrical properties, to provide desired coloring, or for other desired reasons. Other materials may also be added such as solvents surfactants, adhesion promoters, heat stabilizers, and light stabilizers.

Illustrative compositions of the invention are described in the following examples.

In the Examples, the properties of the epoxy resin compositions were evaluated as follows:

Lap shear strength is tested according to ASTM D 1002-72, using 2024T3 clad aluminum substrate, 1.5 mm thick, etched with chromic acid, unless otherwise indicated. Bondline thickness was about 1 mm. The bonds were aged as indicated and then tested at 24° C. using an "Instron" tensile tester at a 2.5 mm/min crosshead separation rate.

Peel strength is tested according to ASTM D 1876-72, using 2024T3 clad aluminum substrate, 0.8 mm thick, etched with chromic acid, unless otherwise indicated. Bondline thickness was about 1 mm to about 6 mm. The bonds were aged as indicated and then tested at 24° C. at a crosshead separation rate of 50 cm/min. Where test results are indicated as being "Z-S", the bond failure was of the "zip-stick" type, i.e. during the peel test the bond repeatedly failed very rapidly for a few centimeters (zip), giving no measurable strength value, and then held for a few centimeters (stick), giving a measurable strength value.

The worklife is determined by mixing the ingredients at 24° C. and measuring the time over which the mixture becomes too viscous to spread.

In the Examples all parts are parts by weight unless otherwise indicated.

EXAMPLE 1

Preparation of amino-terminated polyetherpolyamide curing agent—Polyetherpolyamide I A 170-gallon stainless steel kettle equipped with "Dow-therm"-type heating and with a reflux condenser was purged with nitrogen and then charged with 167 pounds of toluene followed by 420 pounds of ethylene ether diamine having the formula:

$$H_2NCH_2CH_2CH_2-OCH_2CH_2-_3OCH_2CH_2CH_2NH_2$$

Over a period of 45 minutes with agitation there was added 504 pounds of polymeric fatty acid, specifically "Empol 1022" described hereinabove. The batch was heated to 155° C. with medium agitation to maintain a good reflux rate of toluene, and approximately 30 pounds of water was removed by decanting. Toluene was then stripped off until a batch temperature of 175° C. was reached, and then all toluene was drained and a vacuum of about 10 mm was applied. The batch was heated to 195° C., held for 1.5 hours and purged with nitrogen through the bottom of the kettle during the last hour.

After the vacuum stripping the neutralization equivalent was 420–460 grams of sample per gram equivalent of amine. The resulting fluid material was called Polyetherpolyamide I.

EXAMPLE 2

An amino-terminated polyetherpolyamide curing agent was prepared on a laboratory scale using the same general procedures as in Example 1, except using a glass vessel in place of the stainless steel kettle. The polyetherpolyamide made in glass was called Polyetherpolyamide II.

EXAMPLE 3

Preparation of polyetherpolyamide—catalyst mixture

To a resin flask equipped with a mechanical stirrer, thermocouple and vacuum were added 500 parts of Polyetherpolyamide I, and 50 parts of a 39% solution of calcium perchlorate in water. The mixture was heated to 140° F. with stirring and the pressure was slowly reduced to control foaming. A slow nitrogen purge was used. All of the water was eventually removed. The product was a clear stable amber liquid.

EXAMPLE 4

Preparation of polyetherpolyamide—catalyst mixture

In a glass flask were placed 94 parts of Polyetherpolyamide I and 12 parts of a 50% solution of calcium trifluoromethane sulfonate in water. The mixture was heated to 250° F. for one hour while the water was removed under vacuum. The product was a clear, stable amber liquid.

EXAMPLE 5

Preparation of epoxide group-containing compound—catalyst mixture

To a one liter flask fitted with a mechanical stirrer, thermocouple, cold trap and mechanical vacuum pump was placed 500 parts of "DER 332" (Dow Chemical Co.) and 50 parts of a 50% solution of calcium perchlorate in water with enough calcium oxide to bring the pH of the calcium perchlorate solution ot 8. The mixture was heated to 60° C. under full vacuum (about 20 mm of mercury pressure) with stirring for about two hours to remove water and until the mixture became clear. The epoxy-catalyst solution is stable to normal storage conditions.

EXAMPLE 6

Preparation of a polyetherpolyamide—toughening agent mixture

To a resin flask was added 500 parts of Polyetherpolyamide I and 95 parts of "Acryloid KM BTA III F" (Rohm and Haas Co.), a core-shell polymer with a rubbery core of butadiene/styrene copolymer and a thermoplastic shell of methyl methacrylate polymer. The mixture was heated to 88° C. with vigorous stirring for one hour. After cooling the mixture was a stable, light amber liquid which had some gelatinous character.

EXAMPLE 7

Preparation of an epoxide group-containing compound—toughening agent mixture

To a resin flask were added 500 parts of "Epon 828" (Shell Co.), a Bisphenol A diglycidyl ether, and 95 parts "Acryloid KM BTA III F". The mixture was heated to 90° C. with agitation for one about hour until no white particles could be observed. After cooling, the mixture was a stable liquid which was opaque due to air bubbles. Treating with vacuum to remove entrapped air resulted in a fluid slightly cloudy liquid.

EXAMPLES 8–12, Comparative Examples 1–3

Polyetherpolyamide-catalyst mixtures were prepared as in Example 3 using the amounts of Polyetherpolyamide I and calcium perchlorate shown in Table 3. This was used as Part A of an epoxy resin adhesive composition.

Epoxy-toughening agent mixtures were prepared as in Example 7 using Bisphenol A diglycidyl ether as the epoxy component and "Acryloid KM BTA III F", "Acryloid KM 653" (Rohm and Haas Co.), a core-shell polymer having a rubbery core of butadiene/styrene copolymer and a plastic shell of methyl methacrylate polymer, or "Kelpoxy G-239-100" (Spencer Kellog, Div. of Textron, Inc.), an adduct of carboxyl-terminated butadiene acrylonitrile liquid rubber with diglycidyl ether of Bisphenol A, as the toughening agent in the amounts indicated in Table 3. This was used as Part B of an epoxy resin adhesive composition.

Parts A and B of each Example were then mixed together to form the epoxy resin adhesive composition. Comparative Examples 1, 2 and 3 were prepared using ingredients as indicated in Table 3. The worklife, peel strength and lap shear strength were determined for each Example and Comparative Example. The results are shown in Table 3.

TABLE 3

| Example | Adhesive Composition | | | | | Worklife Hours, 10 gram mass | Peel strength (kg/cm) Bonds Aged | | Lap Shear Strength (MPa) Bonds Aged | |
|---|---|---|---|---|---|---|---|---|---|---|
| | Part A | | Part B | | | | | | | |
| | Parts Polyether Polyamide I | Parts Calcium Perchlorate | Parts Bisphenol A diglycidyl ether | Toughening Agent | Parts Toughening Agent | | 5 days 24° C. | 5 days 24° C., 1 hour 150° C. | 5 days 24° C. | 5 days 24° C., 1 hour 150° C. |
| 8 | 47.75 | 0.5 | 42 | Acryloid KM BTA III F | 8 | 2.5 | 7.0 | 7.7 | 15.9 | 23.4 |
| 9 | 47.75 | 1.0 | 42 | Acryloid KM BTA III F | 8 | 1.5 | 6.3 | 8.2 | 16.6 | 29.7 |
| 10 | 47.75 | 2.25 | 42 | Acryloid KM BTA III F | 8 | 0.25 | 10.8 | 8.1 | 26.2 | 26.9 |
| 11 | 49 | 2.3 | 43 | Acryloid KM 653 | 6 | 0.25 | 8.1 | 8.2 | 25.5 | 29.0 |
| 12 | 47 | 2.6 | 30 | Kelpoxy G-293-100 | 20 | 0.5 | 7.5 | 9.0 | 26.2 | 29.0 |
| Comp. Ex. 1 | 47.75 | — | 42 | — | — | 3 | 6.8 | 6.3 | 16.6 | 21.4 |
| Comp. Ex. 2 | 47.75 | 2.25 | 42 | — | — | 0.25 | 4.5 Z-S | 1.9 Z-S | 23.4 | 33.8 |
| Comp. Ex. 3 | 47.75 | — | 42 | Acryloid KM BTA III F | 8 | 3 | 4.5 | 5.9 | 17.9 | 23.4 |

The data in Table 3 demonstrate that use of both a toughening agent and a catalyst provides a rapid cure rate and good peel strength which is retained after aging the bond for one hour at 150° C. The composition used in Comparative Example 1 which contained no catalyst or toughening agent had a long worklife, i.e., was very slow in curing. When catalyst was added to the composition as in Comparative Example 2, the worklife was significantly reduced but the peel strength was deteriorated with particularly undesirable zip-stick failure. When only toughening agent was added, as in Comparative Example 3, the worklife remained long and the peel strength was deteriorated. Only when both catalyst and toughening agent were incorporated in the composition, as in Examples 8-12, was the worklife reduced, i.e., the curing rate accelerated and good peel strength and lap shear strength were achieved. Examples 8-10 show that the worklife of the composition can be varied by controlling the amount of catalyst added. Examples 10-12 show that various toughening agents may be used to provide peel strength which is retained upon heating for one hour at 150° C. The combination of high peel strength, high overlap shear strength and good cure rate indicate that these are epoxy adhesive compositions having a very desirable balance of properties.

EXAMPLE 13

In runs 1 and 2, an anydrous epoxy group-containing compound-catalyst mixture was prepared as in Example 5 using 90.9 parts "DER 332" and 9.1 parts of the metal salt indicated in Table 4 for Part A of the composition and a polyetherpolyamide-toughening agent mixture was prepared as in Example 6 using 84 parts Polyetherpolyamide I and 16 parts "Acryloid KM BTA III F" for Part B of the composition. 20.2 Parts of Part A and 26.2 parts of Part B were mixed to form the epoxy resin composition. In runs 3–6, water was added to the composition in the amounts indicated in Table 4. The worklife and the peel strength and lap shear strength after aging of the cured resin composition were evaluated. The results are shown in Table 4.

TABLE 4

| Run | Metal salt | Parts water | Worklife (min.) | Peel strength (kg/cm) after aging | | Lap shear strength (MPa) after aging | |
|---|---|---|---|---|---|---|---|
| | | | | 24 hr, 24° C. | 24 hr, 24° C. 24 hr, 120° C. | 24 hr, 24° C. | 24 hr, 24° C. 24 hr, 120° C. |
| 1 | Ca(ClO4)2 | 0 | 8 | 8.4 | 7.9 | 19.3 | 23.4 |
| 2 | Sr(ClO4)2 | 0 | 10 | 8.4 | 6.3 | 21.4 | 26.2 |
| 3 | Ca(ClO4)2 | 1.2 | 20 | 3.2 | 3.9 | 10.3 | 22.0 |
| 4 | Ca(ClO4)2 | 2.4 | 35 | 2.5 | 3.8 | 6.2 | 15.2 |
| 5 | Sr(ClO4)2 | 1.2 | 30 | 4.8 | 7.5 | 11.0 | 22.1 |
| 6 | Sr(ClO4)2 | 2.4 | 50 | 1.8 | 3.8 | 5.5 | 15.2 |

The data in Table 4 show that the addition of water to the epoxy resin composition increases the worklife, i.e. decelerates the cure rate, and reduces peel strength and lap shear strength.

EXAMPLE 14

In runs 1 and 2, an epoxide group-containing compound-toughening agent mixture was prepared as in Example 7 using 84 parts "DER 332" and 16 parts "Acryloid KM BTA III F" for Part A of the composition and an anhydrous polyetherpolyamide-catalyst mixture was prepared as in Example 3 using 90.8 parts Polyetherpolyamide I and 9.2 parts of the metal salt indicated in Table 5 for Part B of the composition. 22.2 parts of Part A and 24.2 parts of Part B were mixed to form the epoxy resin composition. In runs 3–6, water was added to the composition in amounts indicated in Table 5. The worklife and the peel strength and lap shear strength after aging of the cured resin composition were evaluated. The results are shown in Table 5.

TABLE 5

| Run | Metal salt | Parts water | Worklife (min.) | Peel strength (kg/cm) after aging | | Lap shear strength (MPa) after aging | |
|---|---|---|---|---|---|---|---|
| | | | | 24 hr, 24° C. | 24 hr, 24° C. 24 hr, 120° C. | 24 hr, 24° C. | 24 hr, 24° C. 24 hr, 120° C. |
| 1 | Ca(ClO$_4$)$_2$ | 0 | 8 | 6.3 | 6.3 | 14.5 | 24.1 |
| 2 | Sr(ClO$_4$)$_2$ | 0 | 30 | 5.4 | 5.6 | 23.4 | 26.9 |
| 3 | Ca(ClO$_4$)$_2$ | 1.2 | 30 | 8.4 | 8.4 | 13.1 | 23.4 |
| 4 | Ca(ClO$_4$)$_2$ | 2.4 | 50 | 5.0 | 5.1 | 9.7 | 23.4 |
| 5 | Sr(ClO$_4$)$_2$ | 1.2 | 75 | 6.1 | 5.2 | 11.7 | 26.9 |
| 6 | Sr(ClO$_4$)$_2$ | 2.4 | 90 | 3.4 | 3.6 | 8.3 | 20 |

The data in Table 5 show that the presence of water in the epoxy resin composition increases worklife, i.e. decelerates cure rate, of the composition. However, when the catalyst is premixed with the polyetherpolyamide, as in Example 14, the presence of water has less effect on peel strength and lap shear strength than when the catalyst is premixed with the epoxide group-containing compound, as in Example 13.

EXAMPLE 15 AND COMPARATIVE EXAMPLES 4 AND 5

In Example 15, a polyetherpolyamide-catalyst mixture was prepared according to the procedure of Example 4 using 16.7 parts of Polyetherpolyamide I and 1.1 part calcium trifluoromethane sulfonate for Part A of the composition, and an epoxide group-containing compound-toughening agent mixture was prepared according to the procedure of Example 7 using 17.4 parts Bisphenol A diglycidyl ether and 2.6 parts "Acryloid KM BTA III F" for Part B. Parts A and B were then mixed to form an epoxy resin adhesive composition. The composition of Comparative Example 4 was similarly prepared, but no catalyst and no toughening agent were added. The composition of Comparative Example 5 was also similarly prepared, adding catalyst but not adding toughening agent. The worklife and the peel strength after high temperature aging of the cured resin composition were evaluated. The results are shown in Table 6.

TABLE 6

| | Adhesive Composition | | | | | | | | | | | |
|---|---|---|---|---|---|---|---|---|---|---|---|---|
| | Part A | | Part B | | | | | | | | | |
| Example | Parts Polyether-polyamide I | Parts calcium trifluoro-methane sulfonate | Parts Bisphenol A diglycidyl ether | Toughening Agent | Parts toughening Agent | Worklife Hours 10 g mass | Peel strength (kg/cm) after hours at 150° C. | | | | | |
| | | | | | | | 1 hr | 2 hr | 4 hr | 24 hr | 168 hr | 336 hr |
| 15 | 16.7 | 1.1 | 17.4 | Acryloid KM BTA III F | 2.6 | 0.5 | 9.3 | 9.0 | 8.4 | 8.2 | 4.1 | 3.0 |
| Comp. Ex. 4 | 19.2 | — | 20 | — | — | 8 | 8.2 | 7.4 | 8.8 | 5.7 | 1.8 Z-S | 1.8 Z-S |
| Comp. Ex. 5 | 19.2 | 1.2 | 20 | — | — | 0.6 | 5.6 | 6.8 | 2.2 Z-S | 1.5 Z-S | 1.5 Z-S | 1.5 Z-S |

The results shown in Table 6 demonstrate that although acceleration of cure rate can be achieved by using only catalyst in a composition containing an epoxide group-containing compound and a polyetherpolyamide, a loss of peel strength occurs. Addition of a toughening agent provides an increase in peel strength values while preserving or enhancing cure rate.

EXAMPLES 16 AND 17 AND COMPARATIVE EXAMPLE 6

In Examples 16 and 17 and Comparative Example 6, Part A of the epoxy resin composition was prepared according to the procedure of Example 5, but using 47.75 parts "Epon 828" as the epoxide group-containing compound and 2.25 parts calcium perchlorate catalyst. In Example 16, Part B of the epoxy resin composition was prepared according to the procedure of Example 6, but using 42 parts Polyetherpolyamide I and 8 parts "Acryloid KM BTA III F" as the polyetherpolyamide and toughening agent, respectively. In Example 17, Part B of the epoxy resin composition was prepared as in Example 16, substituting "Acryloid KM-680" as toughening agent for the "Acryloid KM BTA III F". In Comparative Example 6, Part B of the epoxy resin composition contained no toughening agent. In each Example and the Comparative Example, Parts A and B of the epoxy resin composition were mixed in equal parts. The worklife and the peel strength after aging of the cured resin composition were evaluated. The results are shown in Table 7.

TABLE 7

| | Examples | | Comparative Example |
|---|---|---|---|
| Epoxy resin composition | 16 | 17 | 6 |
| Part A | | | |
| Epon 828 (parts) | 47.75 | 47.75 | 47.75 |
| Calcium perchlorate (parts) | 2.25 | 2.25 | 2.25 |
| Part B | | | |
| Polyetherpolyamide I (parts) | 42 | 42 | 50 |
| Acryloid KMBTAIIIF (parts) | 8 | | |
| Acryloid KM-680 (parts) | | 8 | |
| Adhesive properties | | | |
| Worklife, minutes (20 g mass) | 8 | 7 | 6 |
| Peel strength, kg-cm | | | |
| Aged: 24 hours at 24° C. | 9.0 | 7.2 | 1.8 Z-S |
| Aged: 24 hours at 24° C., 1 hour at 130° C. | 9.7 | 7.2 | 1.9 Z-S |
| Lap shear strength, MPa | | | |
| Aged: 24 hours at 24° C. | 14.3 | 15.5 | 12.6 |
| Aged: 24 hours at 24° C., 1 hour at 130° C. cure | 17.2 | 24.3 | 27.7 |

EXAMPLE 18

Preparation of a polyetherpolyamide from ZZL-0822 and oxalic acid—Polyetherpolyamide III In a glass resin flask equipped with a stirrer, a Dean-Stark trap used for azeotropic removal of water and vacuum were placed 220 g ZZL-0822 (1 mole), 45g oxalic acid (0.5 mole) and 15 ml of toluene. The mixture was heated for two hours at 190° C. while 15 ml of water was removed by azeotropic distillation. The toluene was removed by heating under vacuum. The polyetherpolyamide was a yellow liquid with an equivalent weight of 128 g per N-H group. This material was called Polyetherpolyamide III.

EXAMPLES 19–23

In Examples 19–23, Part A of each epoxy resin composition was prepared according to the procedure of Example 5, using 9 parts calcium perchlorate and 91 parts of the epoxide group-containing compound, and Part B of each epoxy resin composition was prepared according to the procedure of Example 6, substituting Polyetherpolyamide III for Polyetherpolyamide I and using 25 parts "Acryloid KM BTA III F" and 75 parts Polyetherpolyamide III. Parts A and B were mixed in the amounts set forth in Table 8. The worklife and the peel strength after aging of the cured resin compositions were evaluated. The results are shown in Table 8.

TABLE 8

| Epoxy resin composition | Examples | | | | |
|---|---|---|---|---|---|
| | 19 | 20 | 21 | 22 | 23 |
| Part A | | | | | |
| Calcium perchlorate/DER 332 (parts) | 10 | 10 | 10 | 10 | 10 |
| Part B | | | | | |
| Acryloid KM BTA III F/Polyetherpolyamide III (parts) | 6.8 | 8.5 | 10.2 | 11.9 | 13.6 |
| Equivalent ratio of amine to epoxy | 0.8 | 1.0 | 1.2 | 1.4 | 1.6 |
| Worklife, minutes | 3 | 5 | 7 | 12 | 30 |
| Peel strength, kg/cm, | | | | | |
| Aged 24 hours at 24° C. | 0.2 | 7.7 | 9.9 | 6.5 | 4.5 |
| Aged 24 hours at 24° C., 1 hour at 120° C. | 6.3 | 9.0 | 8.1 | 6.8 | 4.8 |

The data of Table 8 demonstrates that a desired combination of both rapid cure and high peel strength are achieved over a wide equivalent ratio of 1.0 to 1.4 equivalents of amine to 1 equivalent of epoxy for the epoxy resin composition of these examples.

EXAMPLE 24

Preparation of polyetherpolyamine from "ZZL-0822" and "Epon 828"

In a medium shear mixer equipped with cooling water was placed 13.39 kg of "ZZL-0822". 9.13 kg of "Epon 828" was added slowly at a rate of 0.454 kg every 10 minutes. As the exotherm began, the temperature was kept below 60° C., the mixture was stirred until the exotherm finished, and the mixture was cooled down to about 49° C. 1.69 Kg imidazole was added with stirring until dissolved. The amine equivalent weight of the resulting mixture was about 120 g per amine group. This mixture was called Polyetherpolyamine IV.

EXAMPLE 25 AND COMPARATIVE EXAMPLE 7

In Example 25 and Comparative Example 7, Part A in each of the epoxy resin compositions was Polyetherpolyamine IV of Example 24. For Part B of Example 25, a mixture of 89 parts of "DER 322" and 11 parts "Acryloid KM BTH III F" was prepared using the procedure of Example 7 and to this mixture was added 3 parts calcium perchlorate using the procedure of Example 5. For Part B of Comparative Example 7, a mixture was prepared as for Example 25, but the calcium perchlorate was omitted. In Example 27 and Comparative Example 15, Parts A and B were mixed to form the epoxy resin composition. Worklife, peel strength after aging and lap shear strength after aging were evaluated. The results are shown in Table 9.

TABLE 9

| Epoxy resin composition | Example 25 | Comparative Example 7 |
|---|---|---|
| Part A | | |
| Polyetherpolyamine IV (parts) | 1.7 | 1.7 |
| Part B | | |
| DER 332/Acryloid KM BTA III F (parts) | none | 2.0 |
| DER 332/Acryloid KM BTA III F/ calcium perchlorate (parts) | 2.0 | none |
| Adhesive properties | | |
| Worklife, minutes | 4 | 30 |
| Peel strength, kg/cm | | |
| Aging: 24 hours at 24° C., measured at 24° C. | 14.4 | 15.2 |
| Aging: 24 hours at 24° C., 1 hour at 120° C., measured at 24° C. | 16.1 | 14.9 |
| Lap shear strength, MPa | | |
| Aging: 24 hours at 24° C., | | |
| measured at 24° C. | 35.8 | 35.8 |
| measured at 82° C. | 4.1 | 3.4 |
| Aging: 24 hours at 24° C., 1 hour at 120° C., measured at 24° C. | 40.7 | 41.4 |

The results of Table 9 demonstrate again the significant improvement in cure acceleration achieved by the composition of the invention and illustrate that both the toughening agent and catalyst may be provided in the same part of the two-part composition of the invention.

EXAMPLES 26 AND 27 AND COMPARATIVE EXAMPLE 8

In Examples 26 and 27 and Comparative Example 8, Part A of each of the epoxy resin compositions was prepared according to the procedures of Example 7 using 84 parts "Epon 828" and 16 parts "Acryloid KM BTA III F". In Examples 26 and 27, Part B of the epoxy resin composition was prepared according to the procedure of Example 4 using "ZZL-0822" and calcium trifluoromethane sulfonate in the amounts, in parts by weight, as indicated. In Comparative Examplke 8, Part B of the epoxy resin composition was "ZZL-0822" with no added catalyst. In each example, Parts A and B were mixed and the worklife, peel strength and lap shear strength of the composition were evaluated. The results are shown in Table 10.

TABLE 10

| Epoxy Resin Composition | Example 26 | Example 27 | Comparative Example 8 |
|---|---|---|---|
| Part A | | | |

TABLE 10-continued

| Epoxy Resin Composition | Example 26 | Example 27 | Comparative Example 8 |
|---|---|---|---|
| Epon 828 | 84 | 84 | 84 |
| Acryloid KM BTA III F Part B | 16 | 16 | 16 |
| ZZL-0822 | 25 | 25 | 25 |
| Calcium trifluoromethane-sulfonate | 1.3 | 2.5 | 0 |
| Adhesive properties | | | |
| Worklife, (minutes, 20 g mass) | 45 | 5 | 120 |
| Peel strength (kg/cm) | | | |
| Initial, 5 days, 24° C. | 1.8 Z-S | 1.8 Z-S | 4.5 |
| Aging: 1 hour at 300° F. | 3.2 | 4.5 | 6.3 |
| Aging: 24 hours at 300° F. | 3.6 | 2.5 | 5.6 |
| Aging: 96 hours at 300° F. | 1.8 Z-S | 2.7 | 4.5 |
| Lap Shear strength (MPa), aged 5 days at 24° C.; tested at: | | | |
| −55° C. | 15.3 | 11.7 | 17.9 |
| 24° C. | 33.3 | 26.9 | 29.7 |
| 82° C. | 2.6 | 3.3 | 2.3 |
| 121° C. | 2.3 | 1.5 | 1.4 |

EXAMPLE 28

The adhesive composition in Example 9 was further tested for adhesive properties using the procedures previously described. Metal substrates were cleaned by solvent wiping using methyl ethyl ketone, abrading with 220 grit sandpaper, and solvent wiping using acetone. Plastic and rubber substrates were cleaned by solvent wiping using isopropyl alcohol, abrading with 220 grit sandpaper, and solvent wiping using isopropyl alcohol. The bond line thickness was 0.01 cm. The bonds were cured for two days at 24° C. prior to testing. Other bonds were exposed to the environments listed below and then were tested at room temperature. The separation rates of the jaws of the tensile tester were 0.024 cm per minute for metal bonds, 5.08 cm/min for plastic bonds and 50.8 cm/min for rubber bonds. Test results are shown in Table 11.

TABLE 11

| Mix Ratio (Part A: Part B) | 1:1 |
|---|---|
| Worklife of 20 g mass, minutes | 23 |
| Time to handling strength, time for lap shear strength bonds to reach 1.1 MPa, Hours | 2 |
| Lap shear strength (MPa) | |
| Rubber-Cold rolled steel (CRS) | |
| Neoprene butadiene rubber-CRS | 0.9, SF* |
| Neoprene rubber-CRS | 0.7, SF |
| Ethylene propylene diene rubber-CRS | 0.3, SF |
| Plastic-plastic | |
| Acrylonitrile butadiene styrene-Same | 6.6, SF |
| Rigid polyvinyl chloride-Same | 5.7, SF |
| Aromatic polycarbonate-Same | 8.1, SF |
| Polymethyl-methacrylate-Same | 5.7, SF |
| Etched aluminum-Etched aluminum | |
| Initial | 20.0 |
| 3 Days at 71° C./100% r.h. | 17.5 |
| 7 Days at 49° C./100% r.h. | 13.4 |
| 30 Days in 24° C. Water | 16.0 |
| Cold rolled steel-Cold rolled steel | |
| Initial | 13.8 |
| 3 Days at 71° C./100% r.h. | 11.7 |
| 30 Days in 24° C. Water | 10.2 |
| Metal-Metal | |
| Stainless steel-Same | 10.8 |
| Galvanized steel-Same | 13.0 |
| Copper-Same | 7.2 |
| Brass-Same | 9.6 |

TABLE 11-continued

| T-Peel Strength, kg/cm | |
|---|---|
| Etched aluminum | |
| Initial | 11.7 |
| After 3 days at 71° C./100% r.h. | 7.4 |
| After 14 days at 49° C./100% r.h. | 5.2 |
| Unetched aluminum | |
| Initial | 3.0 |
| Steel | |
| 0.055 cm thick, Initial | 2.0 |
| 0.081 cm thick, Initial | 4.1 |

*SF - substrate failure

Various modifications and alterations will be apparent to those skilled in the art without departing from the scope and spirit of this invention and this invention should not be restricted to that set forth herein for illustrative purposes.

We claim:

1. A method for adhering a first surface to a second surface comprising the steps of:
   mixing together:
   (a) a curable glycidyl ether epoxide group-containing compound,
   (b) an amino-terminated aliphatic polyether curing agent,
   (c) a polymeric toughening agent having both a rubbery phase and a thermoplastic phase or being capable of forming, with the epoxide group-containing material, both a rubbery phase and a thermoset phase on curing, and
   (d) a metal salt catalyst capable of providing an exotherm of at least 20° C.;
   applying the resulting mixture to a portion of at least said first surface;
   contacting said first and second surfaces in bonding relationship with said mixture disposed therebetween; and
   curing said mixture.

2. The method of claim 1 wherein said mixture contains 75 to 100 parts by weight curable glycidyl ether epoxide group-containing compound, an effective amount of said amino-terminated aliphatic polyether curing agent, 8 to 40 parts by weight of said polymeric toughening agent and 1 to 10 parts by weight of said catalyst, said catalyst being selected from calcium nitrate, lanthanum nitrate, and metal salts having calcium, strontium, or barium cations and perchlorate or trifluoromethane sulfonate anions.

3. An article comprising a first substrate adhered to a second substrate, according to the method of claim 1 said substrates being adhered together by an epoxy resin composition containing
   (a) a curable glycidyl ether epoxide group-containing compound,
   (b) an amino-terminated aliphatic polyether curing agent,
   (c) a polymeric toughening agent having both a rubbery phase and a thermoplastic phase or being capable of forming, with the epoxide group-containing material both a rubbery phase and a thermoset phase on curing, and
   (d) a metal salt catalyst capable of providing an exotherm of at least 20° C.

4. The method of claim 1 wherein said catalyst is a metal salt selected from calcium nitrate, lanthanum nitrate or metal salts having calcium, strontium, or barium cations, and perchlorate or trifluoromethane sulfonate anions.

5. The method of claim 1 wherein said toughening agent is a core/shell polymer selected from methacrylate/butadiene-styrene, acrylate-methacrylate/-butadiene-styrene, acrylonitrile/butadiene-styrene, methacrylate/acrylate polymers or combinations thereof.

6. The method of claim 1 wherein said toughening agent is a carboxyl-terminated butadiene acrylonitrile polymer.

* * * * *